United States Patent [19]

Mason et al.

[11] Patent Number: 4,559,902

[45] Date of Patent: Dec. 24, 1985

[54] APPARATUS AND METHOD FOR HOLDING AND CULTIVATING AQUATIC CRUSTACEANS

[75] Inventors: Edgar G. Mason, Crapaud; Harold Clark, Victoria; James A. Forsythe, Halifax, all of Canada

[73] Assignee: Hugh Paton, Prince Edward Island, Canada

[21] Appl. No.: 613,636

[22] Filed: May 24, 1984

[30] Foreign Application Priority Data

Nov. 28, 1983 [CA] Canada .................................. 442082

[51] Int. Cl.[4] ............................................ A01K 61/00
[52] U.S. Cl. ............................................ 119/2; 119/4
[58] Field of Search ................................ 119/2, 3, 4

[56] References Cited

U.S. PATENT DOCUMENTS

| | | | |
|---|---|---|---|
| 136,834 | 3/1873 | Holton | 119/3 |
| 148,035 | 3/1874 | Clark | 119/3 |
| 3,116,712 | 1/1964 | Ogden | 119/3 |
| 3,192,899 | 7/1965 | Lucey et al. | 119/4 |
| 3,661,262 | 5/1972 | Sanders | 210/169 |
| 3,916,833 | 11/1975 | Serfling | 119/2 |
| 3,985,101 | 10/1976 | Thompson | 119/2 |
| 4,007,709 | 2/1977 | Wishner | 119/2 |
| 4,052,960 | 10/1977 | Birkbeck et al. | 119/3 |
| 4,089,298 | 5/1978 | Wilson | 119/2 |
| 4,198,924 | 4/1980 | Chapman | 119/2 |
| 4,212,268 | 7/1980 | Chapman | 119/2 |
| 4,253,418 | 3/1981 | Lockwood et al. | 119/2 |
| 4,279,218 | 7/1981 | Brinkworth | 119/2 |
| 4,300,477 | 11/1981 | Chapman | 119/2 |
| 4,368,691 | 1/1983 | Brune | 119/2 |

OTHER PUBLICATIONS

Aquaculture Enterprises, "From Concept to Consumer, The Technological Evolution of Lobster Farming".

Primary Examiner—Hugh R. Chamblee
Attorney, Agent, or Firm—Saidman, Sterne, Kessler & Goldstein

[57] ABSTRACT

There is described a method and apparatus for holding and cultivating aquatic crustaceans and like shellfish. The apparatus comprises a well for holding water, a plurality of buoyant trays each sub-divided into a plurality of compartments sized to house a crustacean and having a perforated bottom, the trays being adapted for submersion within the well to form a column of trays whereby the weight of one tray maintains the trays beneath it in a submerged condition. The apparatus further includes an airlift to simultaneously lift water from the vicinity of the bottom of the well for recirculation to the top of the well and to aerate the water as it is being lifted. There is further included an outlet to introduce a supply of fresh extraneous water to the top of the well and to drain water from the bottom of the well in amounts corresponding substantially to that added to the top of the well.

24 Claims, 4 Drawing Figures

APPARATUS AND METHOD FOR HOLDING AND CULTIVATING AQUATIC CRUSTACEANS

BACKGROUND OF THE INVENTION

The present invention relates to the holding and culturing of crustaceans and more particularly to an apparatus and method for raising lobsters from the post larval stage to animals of marketable weight. The present apparatus and method may also be used for the storage and maintenance of naturally harvested lobsters prior to distribution and marketing.

The American lobster, *Homarus americanus*, is the victim of intense fishing pressure. Natural stocks are being exploited to maximum sustainable yield. During recent years, Canadian annual landings have ranged from 18-23 thousand tonnes and appear to have stabilized at that level.

The American lobster is recognized internationally as a connoisseur's delight. The market potential for this animal, especially as a live commodity, could far exceed the supply. There are presently several problems in the live lobster trade which are jeopardizing the live market, namely; inflated retail prices due to high risk of loss of the live lobsters, quality reduction with prolonged storage and intermittent supply. These factors have resulted in increased sales volumes for frozen whole lobsters because of reduced risk of loss, maintained quality with storage, and a supply that can be extended far beyond the fishing season.

The preferred commodity for the consumer is still the freshly cooked lobster. But in order to revitalize its proper market place, the problems of high risk, quality reduction and intermittent supply must be solved.

The live lobster industry uses communal holding tanks, floating cars and crates, and communal tidal pounds to store lobsters from time of landing to shipping. Approximately the percent of lobsters intended for live trade are lost due to injury, disease cannibalism and poor water quality. Injuries encourage the spread of the disease Gaffkemia which is fatal to lobsters but has no effect on humans. Lobsters which become infected with this bacterium become lethargic and fall prey to more vigorous lobsters. During the "feast", millions of virulent bacteria are released, resulting in the infection of surrounding lobsters with skin lesions which act as "portals of entry" for the bacteria. The introduction of one Gaffkemic lobster into a pound of communally held lobsters can result in an epidemic and massive loss. When a shipment of lobsters is purchased from a pound, the present system gives no guarantee as to the incidence of disease. Incidence of disease can be determined by random blood sampling of the stock and determining whether or not Gaffkemia-causing bacteria are present in the samples, but this procedure is expensive and time consuming and has not been adopted by the industry. The inconsistency of the health status of pounded lobsters has persuaded many retailers to purchase the frozen commodity.

Potential spread of disease in communal pounding escalates with increased period of holding. Experienced pound operators turn over stock as quickly as the market dictates or as soon as mortalities start mounting. The high risk associated with holding over extended periods in an attempt to cash in on higher post season prices discourages this practice.

Extended holding results in reduced meat content. The rate of body metabolism of communally stored lobsters is excessive. Feeding of lobsters to deter cannibalism and shrinkage is only partially effective as a lobster's favourite diet, when available, is its own species.

Extended periods of communal holding can result in a high incidence of Gaffkemia, reduced meat content, mutilations and reduced physical appearance and a generally weakened condition making shipping and post shipping storage a volatile situation.

Each year more than $10 million worth of market lobsters are lost during holding due to disease, cannibalism and stress caused mortalities. These losses demonstrate gross inadequacies in the traditional holding facilities.

As mentioned above, the traditional facilities employed for lobster holding include tidal pounds, floating cars and crates, and land based communal holding tanks. These facilities are plagued with significant lobster mortalities due to disease (in particular, Gaffkemia), cannibalism, and stresses caused by overcrowding, physical injuries and fluctuations in water quality. The physical appearance of lobsters that do survive to be sold on the live lobster market is often poor due to claw, leg and antennae losses. Crowded lobsters mutilate one another. These injuries result in many lobsters being rejected by markets which demand "high product quality" and pay premium prices.

Communal holding systems have proven to be breeding grounds for Gaffkemia. This is due to the way in which Gaffkemia can be transmitted from lobster to lobster and the physiological effects on infected lobsters. In order for a lobster to become infected with Gaffkemia, the causative bacterium, *Aerococcus viridans* var. *homari* must enter through a lesion in the integument of the lobster. In communal holding, physical interactions of lobsters cause numerous lesions through limb losses and simple punctures in the integument. If bacteria are present in the water, they can enter a lesion before the natural clotting mechanism of the lobster seals the wound. Once the bacteria have entered, the lobster will die in a matter of days or weeks, depending on the water temperature. Once established in the lobster, the bacteria are responsible for a massive reduction in the blood's clotting ability, disfunction of the hepatopancreas, and reduction in the oxygen binding capacity of the hemocyanin. Infected lobsters become more lethargic with worsening infection. In communal holding, stronger lobsters will mutilate the lethargic ones. When an infected lobster is injured, its blood readily drains from its body. Literally millions of virulent bacteria are released into the surrounding water. As the surrounding lobsters fight to "feast" they in turn become wounded and consequently infected. Very few bacteria are required to trigger an epidemic of Gaffkemia in a communal holding operation.

When lobsters are kept physically isolated in individual holding compartments, where physical contact can be eliminated, the incidence of injury and possibility of infection is dramatically reduced. Even in a Gaffkemia infected water system, lobsters will not become infected unless physical injury occurs.

The need for a commercially viable, high density holding system is therefore obvious and immediate.

In the past, there have been numerous patents issued for systems and procedures for rearing of crustaceans in tanks, cages, or baskets. Most of these systems have completely ignored the biological requirements of the lobster and none have been proven commercially successful to this date.

SUMMARY OF THE INVENTION

It is an object of the invention to provide a means of holding live lobsters over long periods of time with minimal mortalities and a further object is to provide a method and apparatus for providing optimum conditions for growth, maturation, and holding of lobsters from post-larval stage onward to a size of 1 kilo or more.

In a preferred embodiment, the system consists of a series of high density deep tanks containing compartmentalized trays wherein lobsters are individually confined and supplied with a flow of suitable water which after it passes through the system, is filtered, cleansed, ozonated and recycled to the system to provide a life support system.

It is important that all fecal material and waste food particles be removed from the water column in order to prevent disease and to provide optimum conditions for growth.

In another embodiment, it is an object of the present invention to provide a method and apparatus for optimizing the growth and protecting the health of lobster through the continuous removal of waste material from the water column in which the lobster resides.

It is another object of a further preferred embodiment to provide a method and apparatus for converting or removing nitrogenous wastes, waste food and excrement and harmful microorganisms from the water using mechanical and biological filtration in a serially arranged system. In addition, parallel flow paths from these filters through an ozone disperator are provided for lower volume treatment of the water being circulated.

It is yet another object of this invention in a preferred form to provide a semi-closed system wherein the same water is recirculated continuously through the system with the addition of 10-15% new makeup water daily, said water being purified through a continuous process whereby all waste material and dissolved toxic matter are removed. Organisms in the water are removed or destroyed for the purpose of reducing or preventing water borne infections and disease in the lobster. A high oxygen content is maintained in the water column at all times and carbon dioxide, ammonia, nitrates and nitrites, and other dissolved materials that are toxic to the lobster are removed.

Still another object of this invention in a preferred form is to provide a system of trays and tanks that are virtually self-cleaning, actuated by the force of the water flowing through them.

According to the present invention, then, there is provided an apparatus to support a plurality of crustaceans and like shellfish comprising a well for holding water, the well having a downwardly and inwardly constricting base, at least one tray subdivided into a plurality of compartments each sized to house a crustacean and having a perforated bottom, the tray being submersible within the well, lift means to recirculate water from the base of the well to the top thereof and to aerate the water as it is recirculated, and means to selectively drain water from the base of the well in amounts corresponding substantially to amounts of extraneous water added to the top of the well, and for well flushing purposes.

According to another aspect of the present invention, there is also provided a method for holding and cultivating shellfish and like crustaceans including the steps of holding water in a well, submerging a plurality of traps within the well, each tray being subdivided into a plurality of compartments sized to house an individual shellfish, recirculating water from the bottom of the well to the top thereof, aerating the water during the recirculation thereof, adding a supply of extraneous water to the top of the well, and draining water from the bottom of the well in amounts corresponding substantially to the amounts of extraneous water added to the top thereof.

BRIEF DESCRIPTION OF THE DRAWINGS

Embodiments of the present invention will now be described in greater detail and will be better understood when read in conjunction with the following drawings in which.

DETAILED DESCRIPTION

For purposes of illustration, reference will be made herein to the use of the present apparatus for either cultivating or holding lobsters. It will be understood, however, that the present system is adapted for use in the culturing and holding of other aquatic organisms such as crabs, shrimp and crayfish and this without departing from the inventive scope of the apparatus described hereinbelow.

Figure 1:
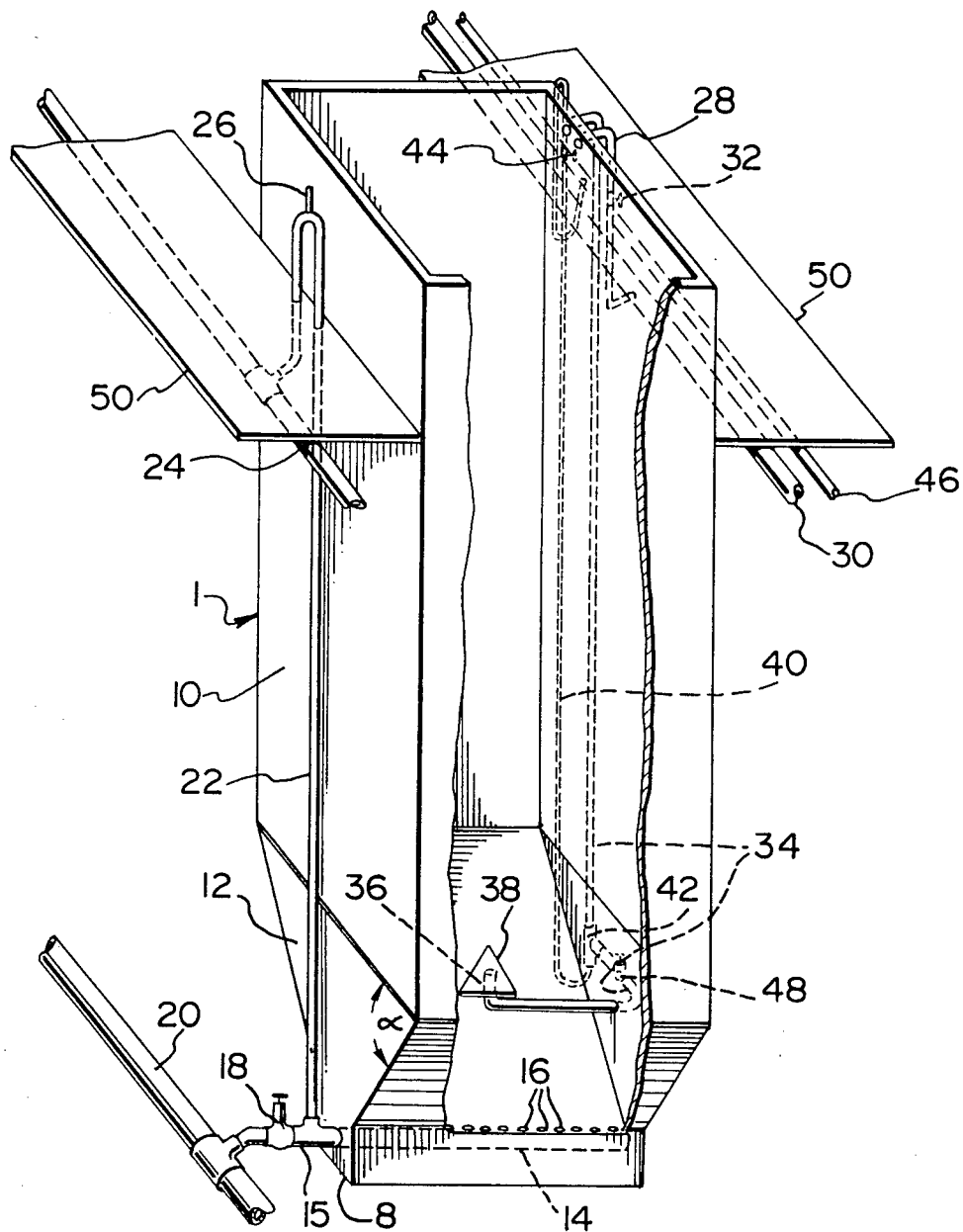
FIG. 1 is a perspective, partially cut-away view of a deep well as described hereinbelow.
Figure 4:
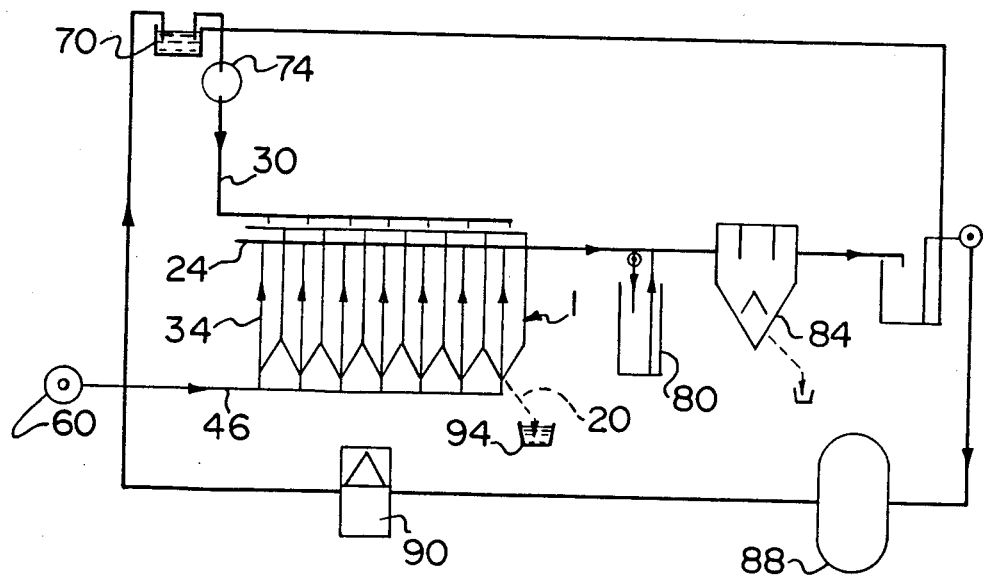
FIG. 4 is a schematical representation of a closed loop system for storing and raising lobsters.

With reference to FIGS. 1 and 4, the present apparatus generally includes one or more vertically oriented deep wells 1 for holding water in which the lobsters live. As will be described below, water is continuously recirculated from the bottom to the top of each well. Water is also drained from the bottom of each well and means are provided to purify and treat this water by removing extraneous matter and contaminants prior to recirculation back to the well. These means include settling tanks, filters and other equipment, the nature of which will be described below. At least one subdivided tray 52 (FIG. 2) and more typically up to 25 or 30 trays are stacked to form a vertical column within the well. Each tray is subdivided into a plurality of compartments 56 (FIG. 2) each sized to house an individual lobster.

The upper portion 10 of well 1 is generally rectangular in both vertical and horizontal cross-sectional shape. In one embodiment constructed by the applicant, upper portion 10 is approximately 117 cm wide, 130 cm deep and 327 cm high. The well includes a base 12 the dimensions of which constrict inwardly and downwardly toward a pedestal or foot 8. The exact shape of the base may vary to include frusto-conical (typically associated with cylindrical wells) or frusto-pyramidal configurations but the V-shape as shown in the figures is preferred in rectangular wells. In the embodiment constructed by the applicant, the base is approximately 1 m high.

Suitable materials for constructing the well include fiberglass, ferrocement or steel. The use of non-porous, relatively light materials is preferred.

The V-shaped base may parallel either of the horizontal dimensions of the well.

At the bottom of the base there will be a drain which in the illustrated embodiment is partially included within pedestal 8. Pedestal 8 includes a perforated drain pipe 14 positioned immediately beneath the apex of base 12. One end of the drain pipe identified by reference numeral 15 extends beyond the pedestal. The drain pipe includes a plurality of perforations and water in the well enters the drain pipe via a plurality of corresponding apertures 16 formed in the apex of the base.

The outer end 15 of the drain pipe includes a valve 18. Intersecting pipe end 15 prior to valve 18 is a vertical conduit means such as pipe 22 for draining water from the well into an upper second drain pipe 24 when valve 18 is closed. When opened, valve 18 controls the flow of water from the well into a third drain pipe 20. The top of conduit 22 just as it curves downwards for connection to drain pipe 24 is adjusted in height to the desired level of water in the well. As will be appreciated, as water is added to the top of the well, an equivalent flow will exit through perforations 16, into drain pipe 14, up conduit 22 to drain pipe 24 to maintain a hydrostatic equilibrium.

The water in either of drain pipes 20 or 24 may be treated and eventually returned to the well or it may simply be drained off as waste.

Particularly when draining the water to waste, it is important that conduit 22 not act as a syphon through which the well might accidentally be drained. To prevent a syphoning effect, a small open-ended vertical tube 26 is located at the apex of conduit 22 to break the suction effect.

Water circulation within the well is from the top to the bottom. Water is delivered at the top of the well through two water lines. Fresh make up water from a reservoir (to be described below) is supplied via supply lines 30 and 28. A valve 32 controls the volume of flow into the well. Fresh water added to the top of the well accounts for a relatively small portion of the total water recirculated through the well.

The majority of recirculated water is lifted from the bottom of the well directly to the top thereof using lift means that will now be described.

Water from the base of the well is lifted to the top of the well for direct recirculation via conduit means such as water line 34. Air is used in the vertical portion of conduit 34 to lift the water, the air being supplied to a diffusion plate (not shown) located at the bottom of T-fitting 42.

The air to the diffusion plate is supplied by an air line 40 which in turn connects to a main air line 46 which is supplied with air from a blower 60 (FIG. 4). The rate of air flow through air line 40 is controlled by a valve 44 and as will be appreciated, regulation of the air flow indirectly controls the rate of water flow through conduit 34.

So that T-fitting 42 may be periodically serviced, a valve 48 is placed in the horizontal portion of conduit 34 to prevent water loss.

In operation, recirculated water enters line 34 through an upwards facing intake end or opening 36, the water being drawn in by the uplifting effect of the air. To prevent ingress of unwanted particulate matter into conduit 34, a suitable shield member such as umbrella 38 is positioned over intake 36. Detritus is deflected by the umbrella and settles into the V-shaped base from whence it may be flushed from the well in a manner to be described below. The outlet end of conduit 34 is arranged as shown to discharge water to the top of the well.

It has been found that the use of air to lift the water is considerably more energy efficient than pumping the same flow using a conventional pumping unit. Moreover, air lifting simultaneously and efficiently aerates the water to prolong its safe reuse within the well.

The trays of lobsters in the well are of course accessed from the top of the well. Walkways such as catwalks 50 are located about the top of the well to provide the necessary access.

Figure 2:
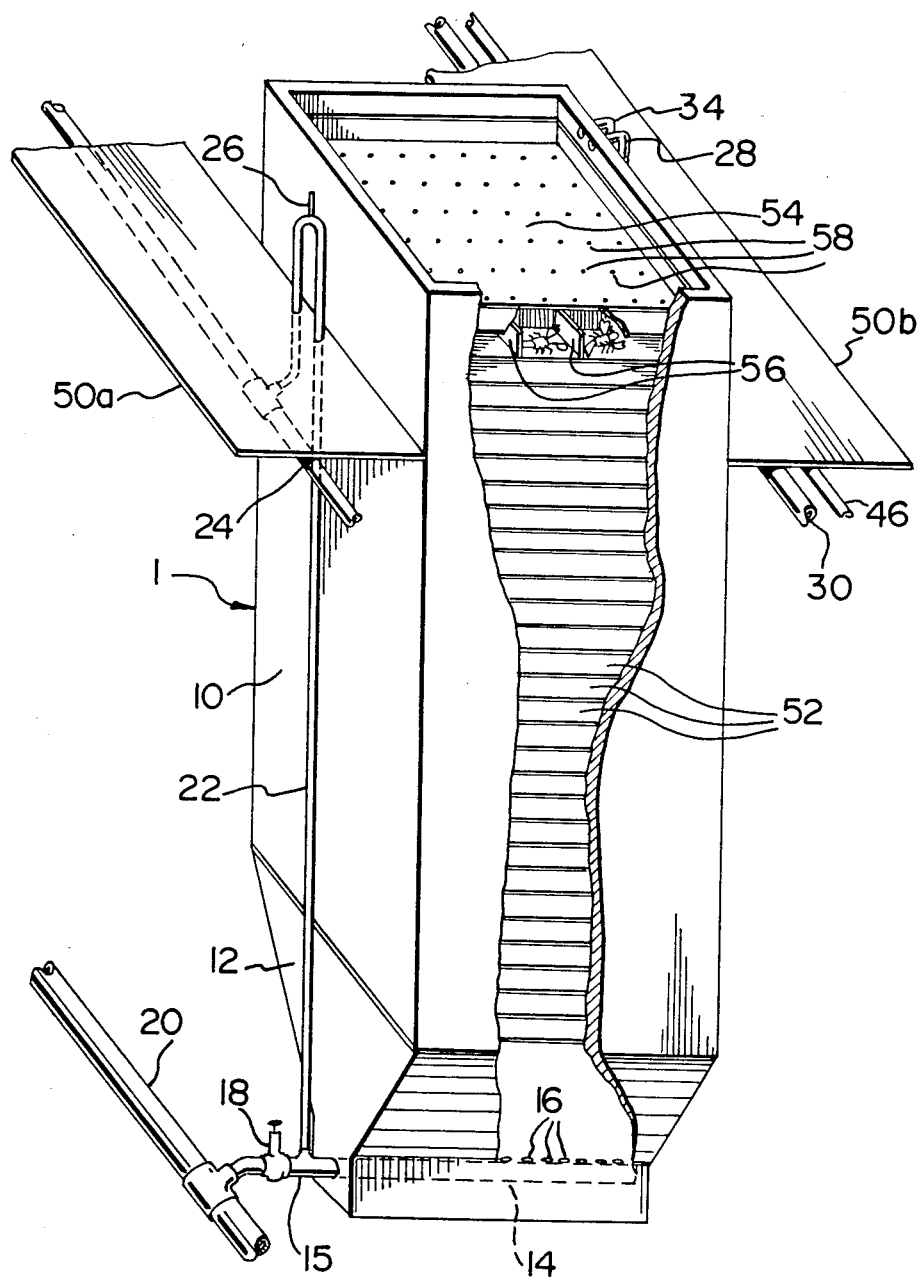
FIG. 2 is another view of the well of FIG. 1 including a plurality of trays forming a column therein.

Reference will now be made to FIG. 2 wherein like reference numerals have been used to denote like elements.

Stacked within the well to form a vertical column is at least one but more typically a plurality of trays 52. Each tray is subdivided into a number of compartments 56 each of which is sized to house an individual lobster. The compartments may vary in size from tray to tray depending upon the size of the lobsters being housed. The compartments will obviously be relatively small in the case of young lobsters and will be considerably larger when the animals are approaching marketable size.

Up to 25 or 30 trays may be stacked in a single well. Each tray includes a perforated bottom to permit the circulation of water and the settling of detritus towards the V-shaped base. In other respects, the actual construction of the trays is not critical although obviously it will be advantageous to provide adjacent trays with tongue-and-groove constructions or the like to facilitate stacking and equally obviously, the outer dimensions of the trays should be slightly smaller than the inner dimensions of the well for a loose but reasonably close fit.

As mentioned, it is necessary to access the top of each tray for inspecting and feeding the lobsters housed therein. To this end, as the lobsters in each tray are fed or otherwise dealt with, the tray is removed and placed in an adjacent well so that the lobsters in the underlying tray may in turn be fed or serviced. Clearly, the underlying trays must be elevated towards the top of the well as successive trays are removed. To do so, lifting means of any suitable sort including hydraulic or electric lifters or even a rope and pulley arrangement may be used. More advantageously, the trays may be fabricated from a buoyant plastics material so that as the trays are sequentially removed from the well, the remaining trays float incrementally upward to take their place. Correspondingly, as successive trays are added to an adjacent well, the previous trays are submerged to a progressively greater depth.

Lobsters in the top tray in each well can escape if not covered and to prevent this retaining means such as a perforated plate in the form of for example lid 54 is secured to the well to cover the top tray and to maintain the entire column of trays in a submerged condition. Lid 54 includes a number of evenly spaced perforations 58. Water delivered to the lid from water lines 28 and 34 is thereby evenly distributed through the perforations to each of the underlying compartments in which the lobsters are housed.

As mentioned above, water travels downwards through the stacked trays via the perforations in the floor of each tray. The downward flow of water brings fresh aerated and treated water to each lobster while carrying detritus away through the perforations. Detritus is continuously removed from the well through the drain system. The slope of the inwardly tapering walls of the V-shaped base cause waste particles to slough down the walls into the apex of the V from whence they enter drain pipe 14. The sloping sides of the base should be inclined at a relatively steep angle from the horizontal to enhance sloughing. Inclines in the range of 45° to 70° are feasible and in a preferred embodiment constructed by the applicant, the incline indicated by angle $\alpha$ in FIG. 3, is 60°.

During normal operations, well effluent will flow through conduit 22. From time to time, it will be desirable to remove accumulated effluent in the base and trays by rapid flushing of the well. This is easily done by opening drain valve 18 to cause rapid removal of water and entrained destritus from the well via third drain pipe 20. The high velocity of the draining water scrubs the sides of the base to remove sediments that have not previously sloughed to the bottom of the base. When flushing the well, an equivalent flow of fresh water may be added to the top of the well to avoid exposing the lobsters to ambient air.

Figure 3:
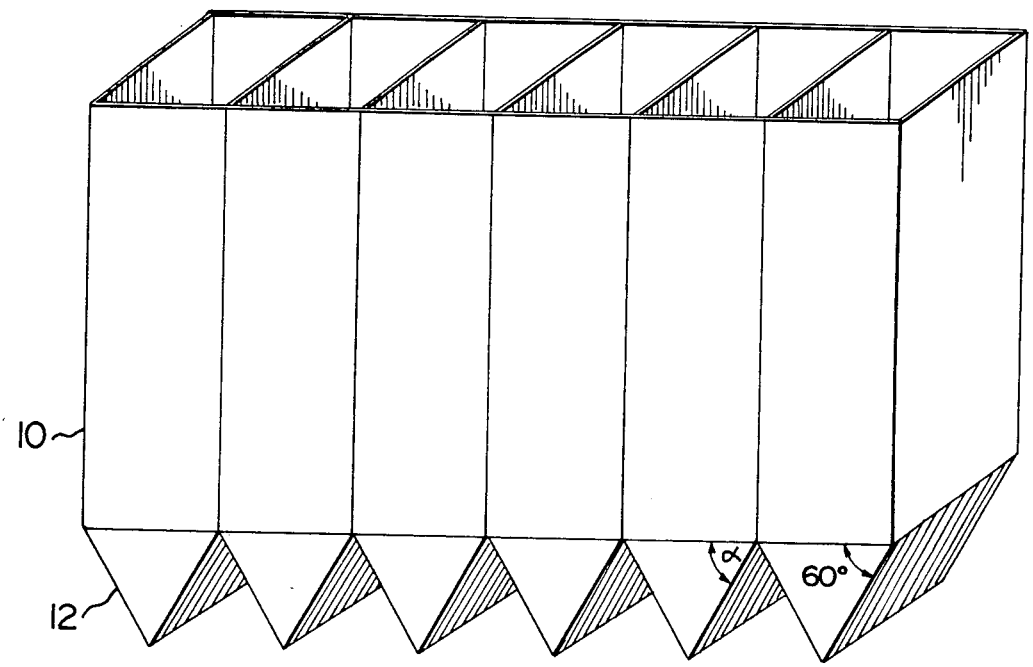
FIG. 3 is a perspective view of a plurality of wells arranged in a row.

With reference now to FIG. 3, it is contemplated that high density holding and culturing operations will be possible simply by means of combining a plurality of wells into rows of modular units. Conduits such as drains 20 and 24 and water and air lines 30 and 46, respectively, will run the length of each row of wells for attachment to the respective air and water conduits associated individually therewith.

With reference now to FIG. 4, the present system as a whole is shown schematically. A row of wells 1 is shown with each well having its own air lift 34 connected to a blower 60 and a fresh water inlet communicating with a constant head reservoir 70. Reservoir 70 is supplied with water of suitable salinity and purity and of course it will be appreciated throughout that references herein to "fresh" water refer to treated and purified salt water and not the fresh variety in which lobsters cannot of course live. When utilizing the present apparatus for the holding or culturing of fresh water species such as some varieties of shrimp, it will be obvious that the water used will in fact be of the fresh variety.

Reservoir 70 is hydrostatically arranged so that the water supplied to the wells via supply line 30 may be gravity fed to save pumping costs. Approximately 10 to 15% of the water recirculated through each well is fresh water from reservoir 70, the balance being recirculated from the bottom of each well to the top via conduit 34. Depending upon the biological condition of the animals themselves, it will be necessary to control the temperature of the water and this is done by means of a heater/cooler assembly 74 located in supply line 30.

Water normally drained from the wells via upper drain line 24 may be wasted but more typically, the water is filtered, treated and returned to the reservoir for recirculation to the wells. To purify the water for reuse, the water may be passed through a biological filter, a number of suitable types of which are commercially available, a settling tank 84, filter means 88 and means for introducing ozone in predetermined amounts such as ozonator 90. The biological filter is optional and indeed, other arrangements of settling tanks and filters are possible and feasible. The arrangement illustrated in FIG. 4 is exemplary only and should not be considered limitative in any sense.

It will be appreciated by those skilled in the art that the introduction of ozone to the system water is a unique innovation in the holding and culturing of lobsters. It is believed that the ozone, introduced to the water in carefully controlled, empirically determined amounts, breaks up and oxidizes particulate and biological contaminants. Moreover, dramatic improvements in the general health and wellbeing of the animals have been observed although the precise manner in which the ozone operates to yield these advantages is not as yet clearly understood.

Water drained via lower drain 20 is removed to a primary sludge settling tank 94 from whence the water may be either wasted or returned to the purification cycle for further recirculation to the wells.

All fresh water added to the wells is of course tested and treated to ensure proper salinity and pH as is well known in the art.

The present system enjoys a number of intrinsic advantages over prior systems. Water consumption is reduced to a minimum as is the need for water treatment. It has been found that the surfaces of the trays and the interior walls of the wells themselves provide a large surface area which supports a large population of aerobic bacteria. These bacteria are responsible for biological filtration to thereby prolong the safe reuse of water within each well. The system is energy efficient. It permits the controlled feeding of precise amounts of food to lobsters at different growth stages while facilitating high animal concentrations within a limited space. Perhaps more importantly, the system meets the biological requirements of each animal to allow long-term holding and culturing with minimum trauma, infection and mortality. The system is also amenable to automatic feeding apparati for depositing a precise and predetermined amount of food in each lobster compartment. The system may of course be used to hold naturally harvested lobsters until market conditions are right or to actually raise cultured lobsters to marketable weights.

Although preferred embodiments of the invention have been described in considerable detail for illustrative purposes, many modifications will occur to those skilled in the art without departing from the inventive scope which is limited only by the true scope of the appended claims.

We claim:

1. Apparatus for holding and cultivating shellfish and the like comprising:
   a well having an open top and a closed bottom for holding water;
   a plurality of buoyant trays each subdivided into a plurality of compartments sized to house a shellfish and having a perforated bottom, said trays being adapted for submersion within the well to form a column of trays;
   means to maintain said column of trays in a submerged condition;
   means to draw water from the vicinity of the bottom of said well and to lift and aerate the same for recirculation to the top of the well;
   means to introduce a supply of fresh treated water to the top of the well; and
   drain means to drain water from the bottom of said well.

2. The apparatus of claim 1 wherein a plurality of said wells are positioned adjacent one another to form a row of wells.

3. The apparatus of claim 1 wherein said means to maintain said column of trays in a submerged condition include retaining means having perforations formed therein, said retaining means being fitted to the top of the well to overlie said column of trays and maintain the same in a submerged condition, said fresh treated and recirculated water being discharged onto said retaining means for even distribution to the well through said perforations.

4. The apparatus of claim 3 wherein the surfaces of the well at said bottom thereof taper inwardly and downwardly to form, when seen in elevation, a substantially V-shaped base.

5. The apparatus of claim 4 wherein said means to draw water comprise conduit means having an intake end thereof disposed within said V-shaped base to draw in water and an outlet end arranged to discharge the water into said top of the well, and blower means for injecting air into said conduit means to cause air lifting of the water to said top of the well and to aerate the same prior to the discharge thereof.

6. The apparatus of claim 5 further including a shield member disposed about said intake end of said conduit means to inhibit entry of particulate matter thereinto.

7. The apparatus of claim 6 further including means for introducing ozone in predetermined amounts to said fresh water to oxidize particulates and contaminants therein prior to discharge of said fresh water into said top of the well.

8. The apparatus of claim 6 further including means for removing particulates and contaminants from the water drained from said bottom of the well and reservoir means to store the water from which said particulates and contaminants have been removed.

9. The apparatus of claim 8 wherein said reservoir means is the source of said fresh treated water added to said top of the well.

10. The apparatus of claim 9 wherein said means to remove said particulates and contaminants include at least one settling tank for removing relatively large particles and at least one filter means for removing remaining particulates and contaminants.

11. The apparatus of claim 10 wherein said means to remove said particulates and contaminants further includes means for introducing ozone in predetermined amounts to said water drained from said bottom of the well for oxidation of said particulates and contaminants.

12. The apparatus of claim 11 wherein said drain means include a drain located at the bottom of said base and conduit means also in fluid communication with the bottom of said well and arranged hydrostatically to continuously maintain the water in said well at a predetermined level.

13. The apparatus of claim 12 wherein said conduit means comprise a vertically arranged pipe communicating at its lower end with the water in said base and including at its upper end a downwardly turned portion adapted for connection to a second drain, the height of said upper end corresponding to said predetermined level of water in the well.

14. The apparatus of claim 13 wherein said drain located at the bottom of said base includes a valve which when opened permits rapid flushing of water from said well into a third drain for the purpose of carrying away accumulated particulates and contaminants.

15. The apparatus of claim 14 wherein water drained into said second or third drains may be either purified and recycled into said well via said reservoir means or disposed of as waste.

16. The apparatus of claim 15 further including a water supply line for the flow of fresh treated water between said reservoir means and said well.

17. The apparatus of claim 16 wherein the inwardly tapering surfaces of said V-shaped base are sloped at an angle in the range of 45° to 70° from the horizontal.

18. The apparatus of claim 17 wherein the inwardly tapering surfaces of said V-shaped base are sloped at an angle of substantially 60° from the horizontal.

19. The apparatus of claim 18 wherein the rate of injection of air into said air lift conduit means is controlled by a valve member to control the rate of lifting of water to said top of the well.

20. The apparatus of claim 18 wherein a plurality of said wells are positioned adjacent one another to form a row of wells.

21. A method for holding and cultivating marine shellfish and like organisms including the steps of holding water in a well;
housing a single shellfish in a compartment a plurality of which are formed in a buoyant tray and submerging a plurality of said buoyant trays within said well to form a column of trays;
maintaining said column of trays in a submerged condition within said well;
drawing water from the vicinity of the bottom of said well and recirculating the same for discharge to the top of said well;
aerating said recirculated water prior to the discharge thereof;
adding a supply of fresh treated water to the top of said well, the volume of said fresh treated water being substantially less than the volume of said recirculated water;
draining water from the bottom of said well in amounts corresponding substantially to the amounts of said fresh treated water added to the top thereof; and
intermittently draining larger amounts of water from the well to flush away accumulated particulates and contaminants.

22. The method of claim 21 wherein said column of trays is maintained in a submerged condition by means of perforated retaining means affixed to the top of the well to overlie said column.

23. The method of claim 22 wherein water drained from said well is purified and recirculated to said well or disposed of as waste.

24. The method of claim 23 wherein said water drained from said well is purified at least in part by adding ozone thereto in predetermined amounts to oxidize particulates and contaminants in said water.

* * * * *